(12) United States Patent
Honig

(10) Patent No.: US 11,135,038 B2
(45) Date of Patent: Oct. 5, 2021

(54) SYSTEM, DEVICE AND METHOD FOR RESTORING THE USE OF A DAMAGED DENTAL IMPLANT

(71) Applicant: ABRACADABRA IMPLANTS LTD, Bat Yam (IL)

(72) Inventor: Iulian Honig, Tel Aviv (IL)

(*) Notice: Subject to any disclaimer, the term of this patent is extended or adjusted under 35 U.S.C. 154(b) by 79 days.

(21) Appl. No.: 15/777,401

(22) PCT Filed: Nov. 18, 2016

(86) PCT No.: PCT/IL2016/051241
§ 371 (c)(1),
(2) Date: May 18, 2018

(87) PCT Pub. No.: WO2017/085725
PCT Pub. Date: May 26, 2017

(65) Prior Publication Data
US 2018/0325634 A1 Nov. 15, 2018

(30) Foreign Application Priority Data
Nov. 19, 2015 (IL) .......................................... 242699

(51) Int. Cl.
*A61C 8/00* (2006.01)

(52) U.S. Cl.
CPC .......... *A61C 8/0078* (2013.01); *A61C 8/0063* (2013.01); *A61C 8/0068* (2013.01); *A61C 8/0074* (2013.01); *A61C 8/0075* (2013.01); *A61C 8/0089* (2013.01); *A61C 8/0001* (2013.01)

(58) Field of Classification Search
CPC ... A61C 8/0078; A61C 8/0063; A61C 8/0068; A61C 8/0074; A61C 8/0075; A61C 8/0089; A61C 8/0001
See application file for complete search history.

(56) References Cited

U.S. PATENT DOCUMENTS

| | | | | |
|---|---|---|---|---|
| 2010/0304329 A1* | 12/2010 | Heo | ...................... | A61C 8/0089 433/146 |
| 2010/0323326 A1* | 12/2010 | Reed | .................... | A61C 8/0068 433/174 |
| 2011/0318706 A1* | 12/2011 | Brajnovic | ............ | A61C 8/0022 433/174 |
| 2015/0157426 A1* | 6/2015 | Choi | .................... | A61C 8/0063 433/174 |
| 2016/0067016 A1* | 3/2016 | Hur | ...................... | A61C 8/0089 433/147 |

FOREIGN PATENT DOCUMENTS

| | | |
|---|---|---|
| DE | 20303653 U1 | 5/2004 |
| EP | 2392289 A1 | 10/2010 |
| KR | 20150000720 A | 1/2015 |
| WO | WO2013/014643 A | 1/2013 |
| WO | WO2014/108906 A | 7/2014 |

OTHER PUBLICATIONS

Machine translatin of KO 10-2015-0000720 (Year: 2015).*
Machine translation of foreign language patents.

* cited by examiner

Primary Examiner — Heidi M Eide
(74) Attorney, Agent, or Firm — Shalom Wertsberger; Saltamar Innovations

(57) ABSTRACT

A system, device and method for restoring the use of a damaged dental implant. The system, device and method utilizes a dual thread fixation screw capable of coupling an abutment or abutment assembly to the damaged dental implant, therein rescuing the damaged dental implant.

9 Claims, 11 Drawing Sheets

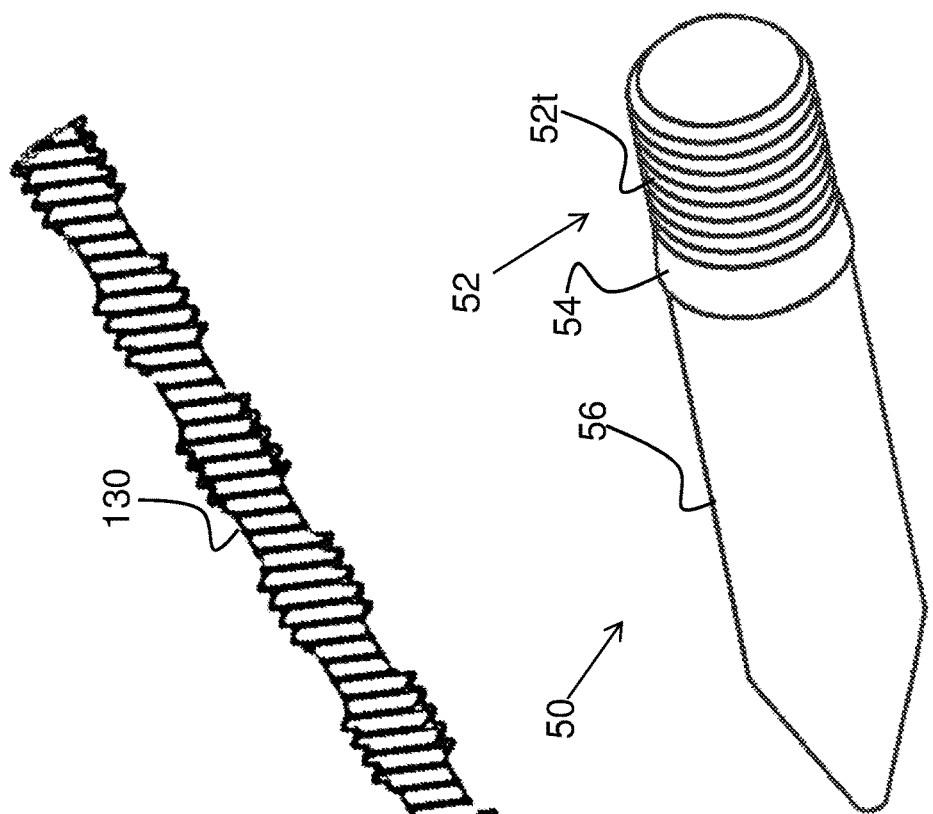
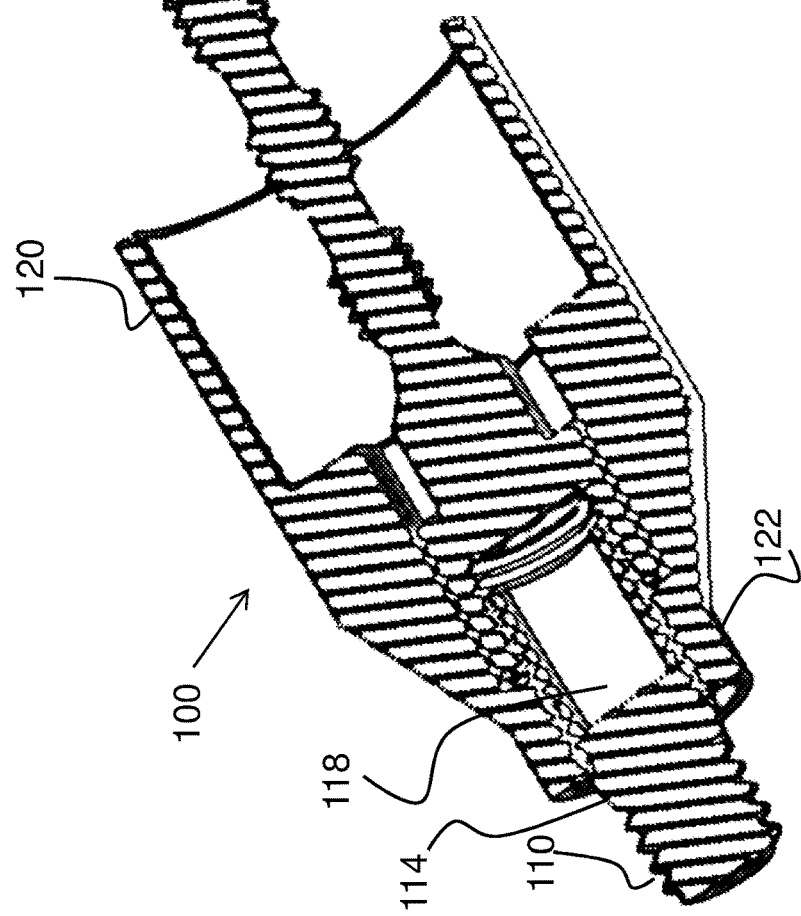

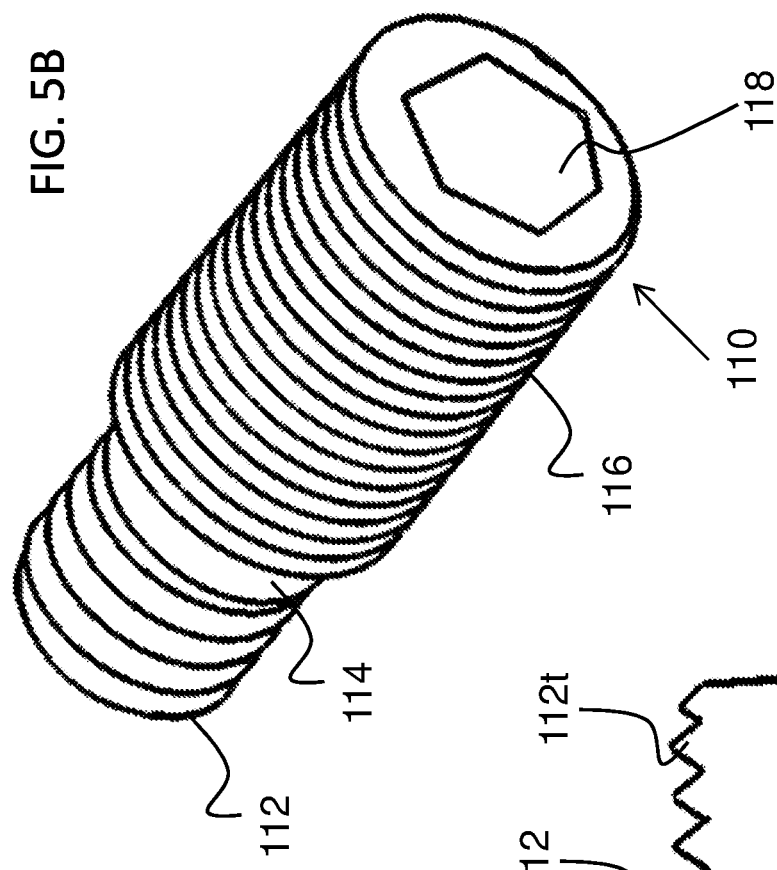
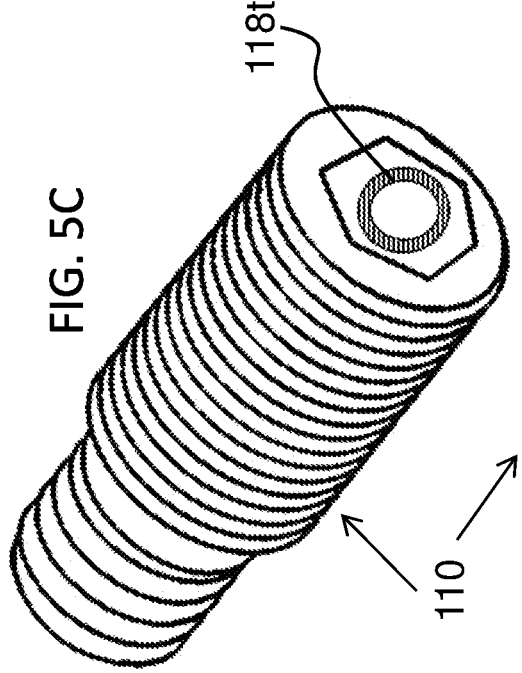
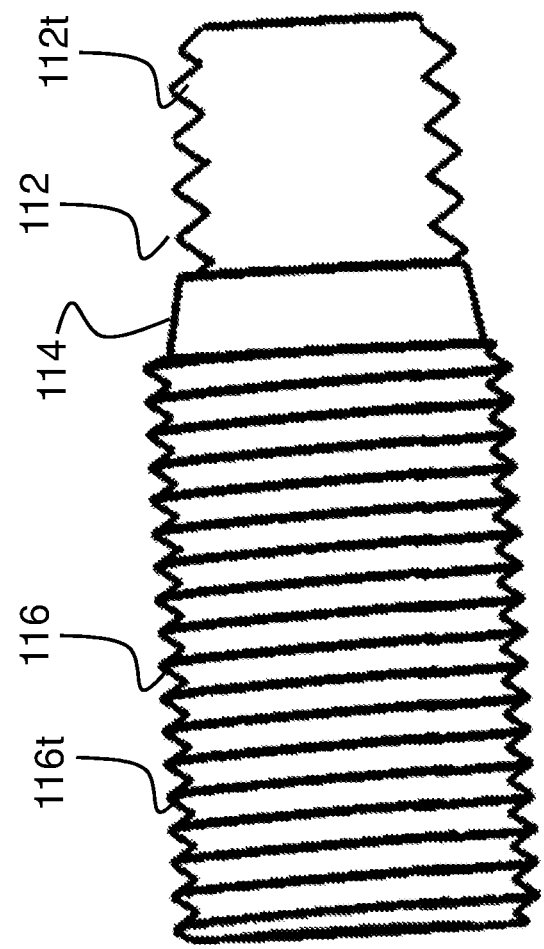

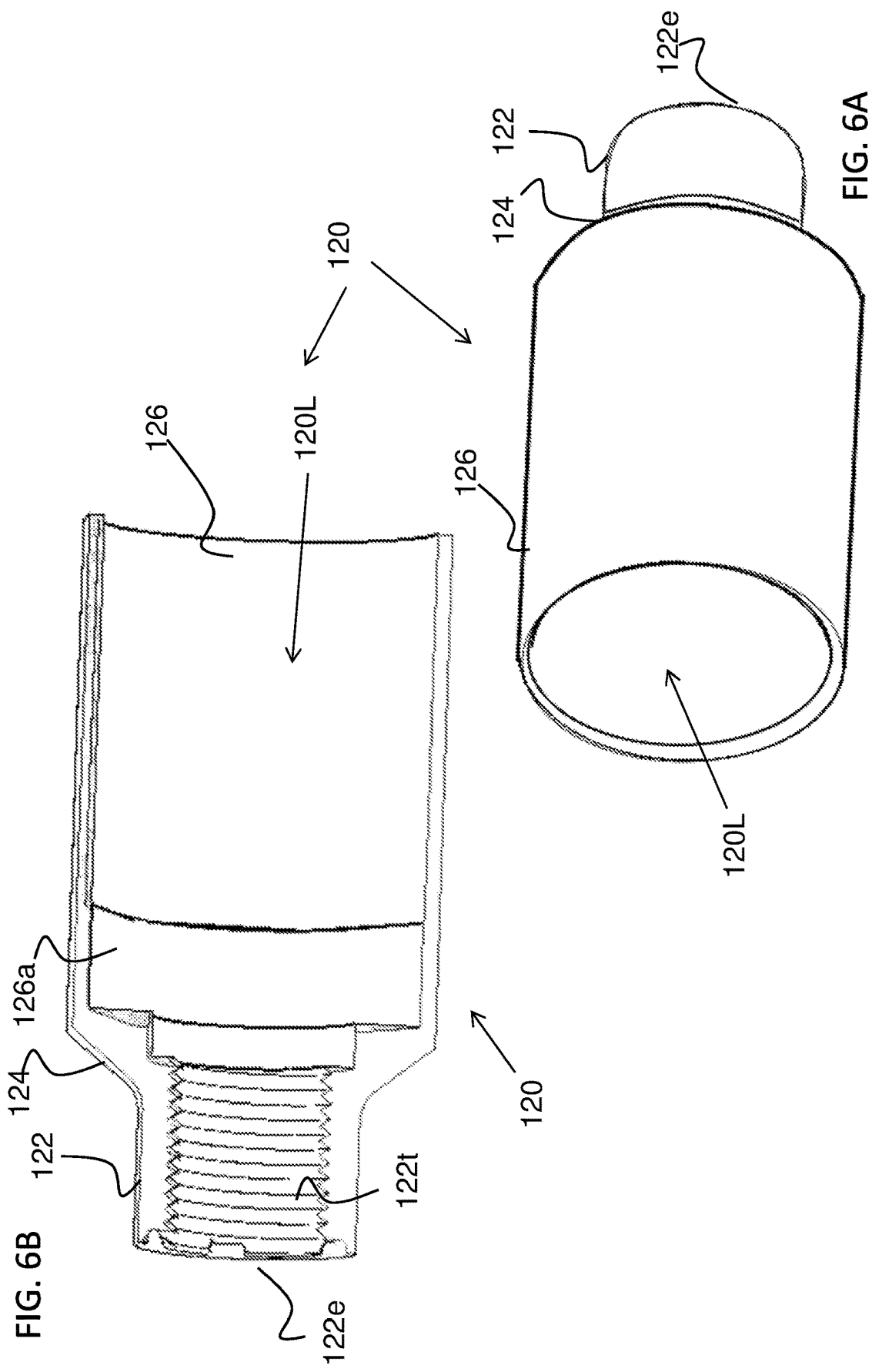

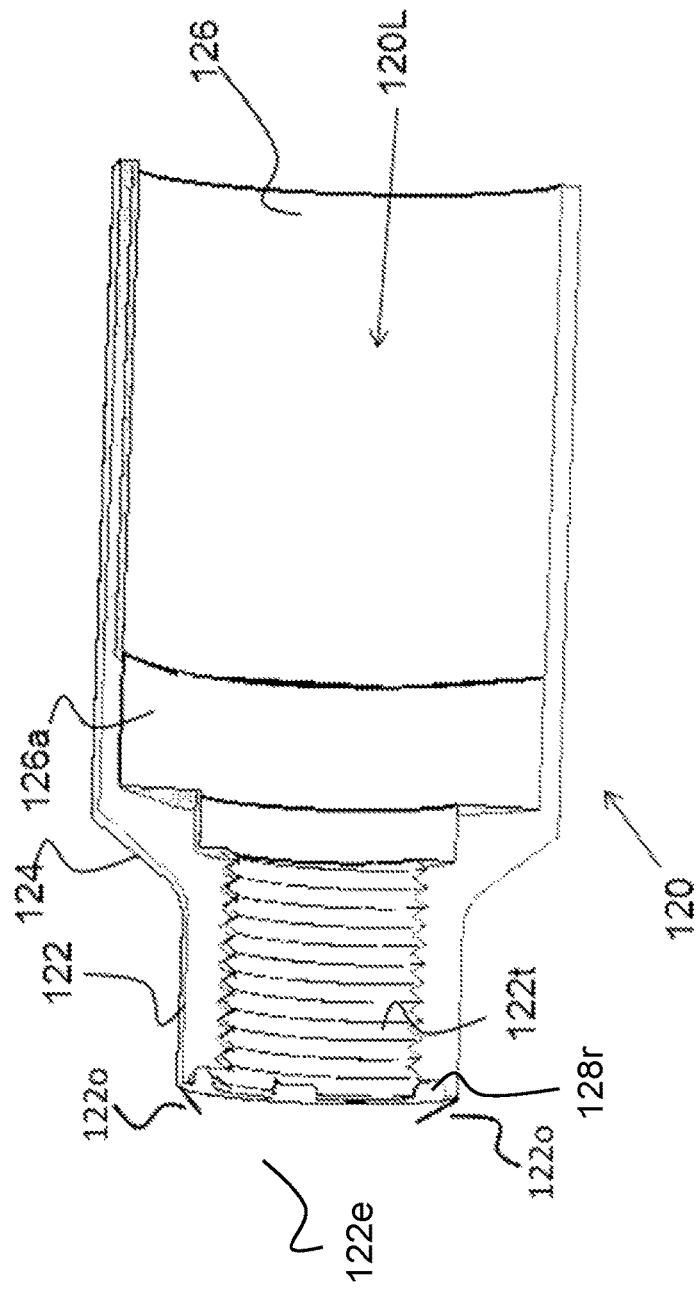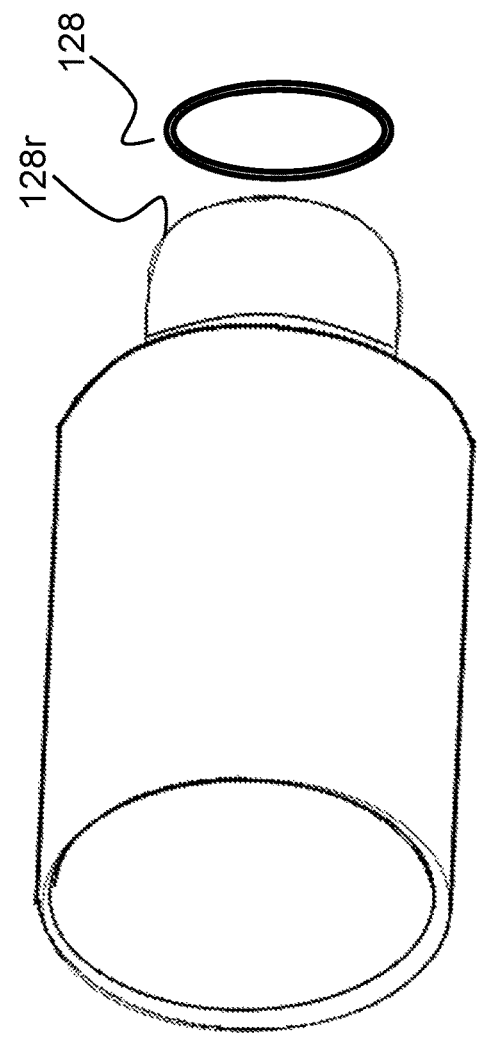

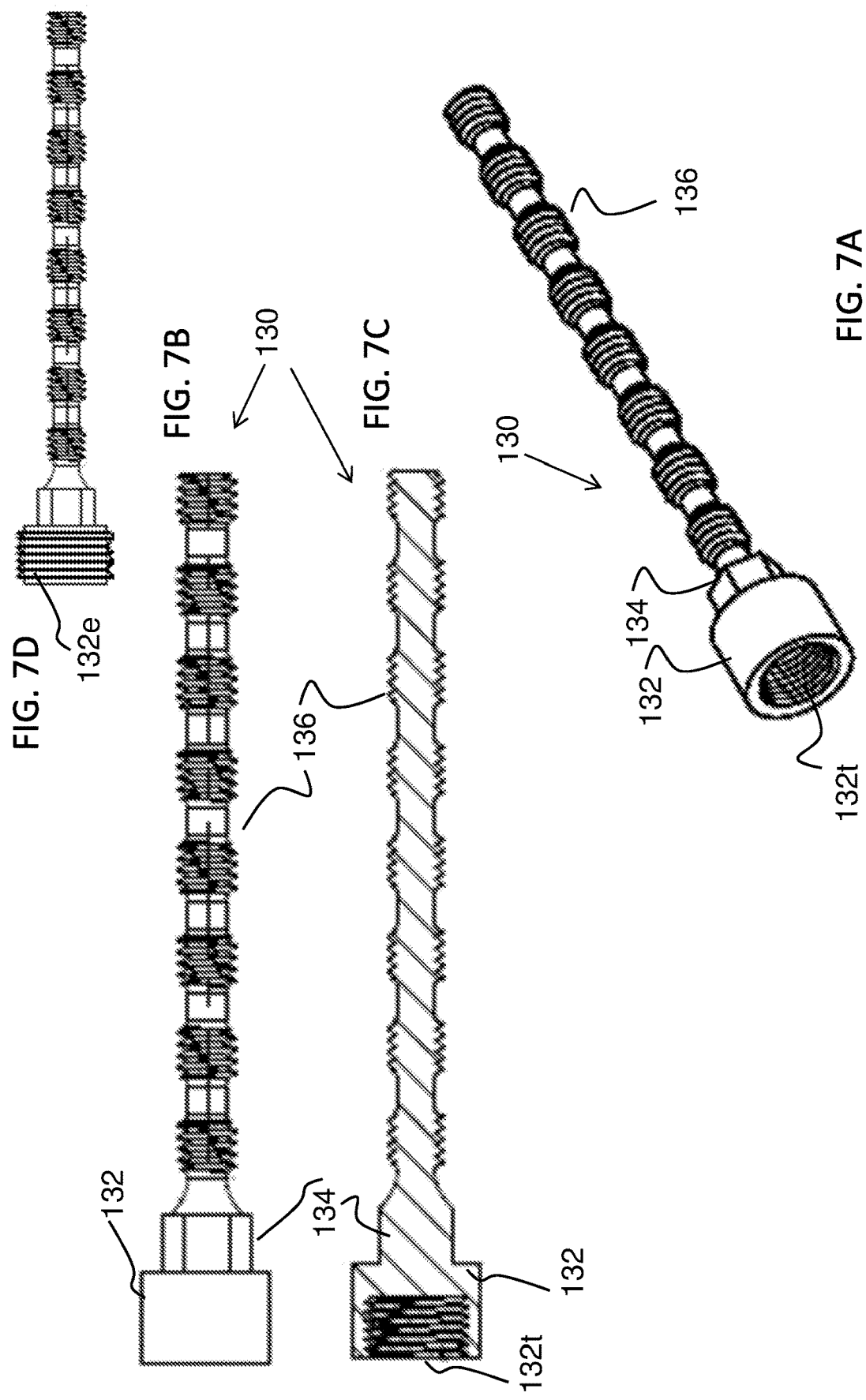

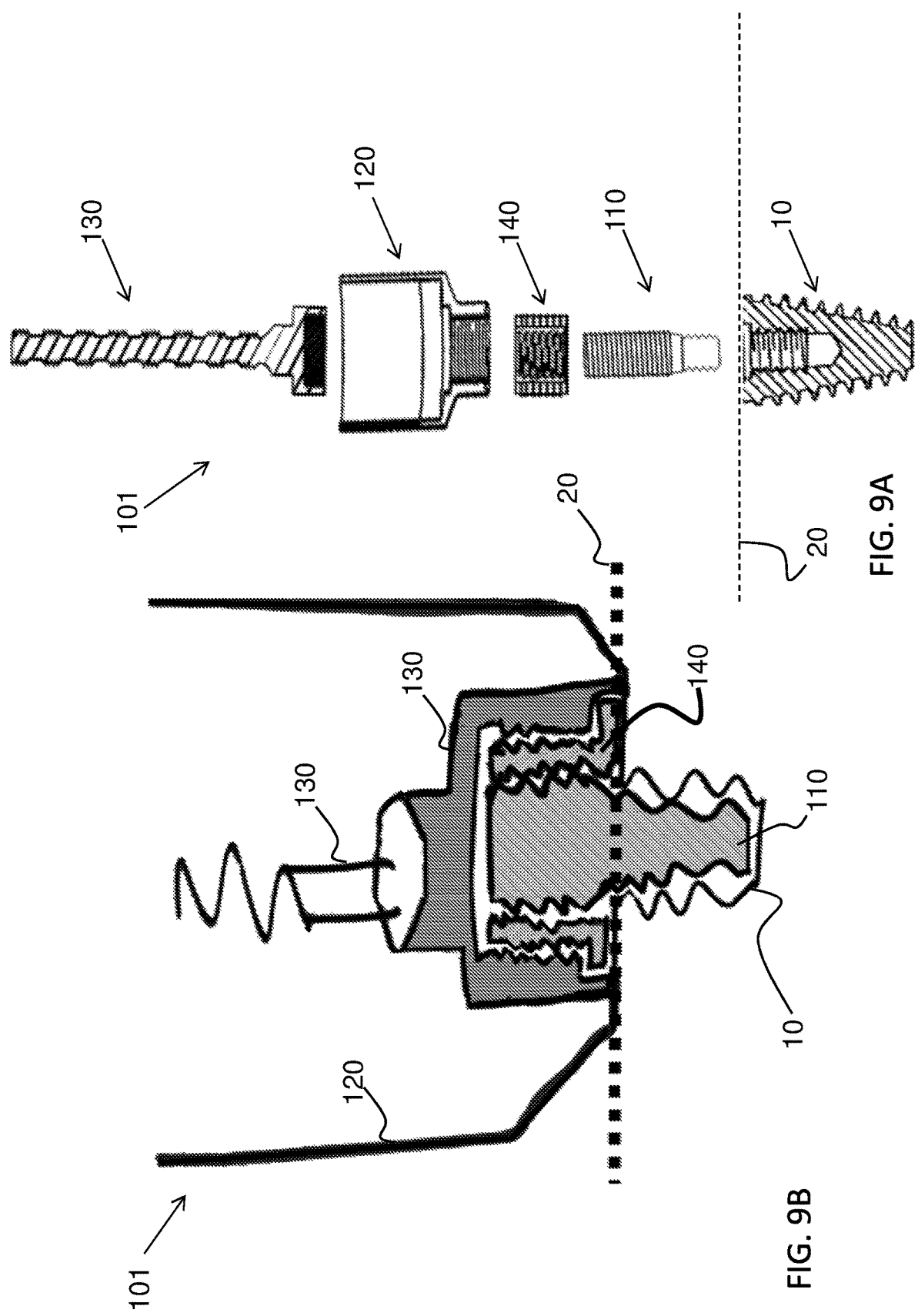

SYSTEM, DEVICE AND METHOD FOR RESTORING THE USE OF A DAMAGED DENTAL IMPLANT

FIELD OF THE INVENTION

The present invention relates to dental implants and in particular, to a system, device and method which provides for restoring the use of a damaged dental implant that would otherwise require removal and/or replacement.

BACKGROUND OF THE INVENTION

Dental implants are commonly used to replace teeth and are well known in the art. Dental restorations over implants typically include three major parts: an implant, an abutment and a crown. The dental implant is securely inserted and anchored into the patient's jawbone, the abutment member is attached to the implant, and the crown is coupled to the abutment to replace the natural tooth.

A common problem following implantation is mechanical failures and/or damage of the implant for example in the form of cracking and/or breaking of the dental implant. Such breakage and/or cracking is indicative of the fact that the implant cannot perform its function of supporting the abutment and crown that are associated with it. Furthermore it necessitates that use of the implant should cease.

Such mechanical failure with dental implants is particular prevalent at the implant's neck level. Once a dental implant becomes broken and/or cracked the implant is rendered non-useable.

Generally implant mechanical failure is solved by way of surgical removal of the implant, filling the crater with bone graft and allowing the implant site to heal for a period of 12-18 months. Implant removal procedure is problematic in that it is expensive, painful, and lends itself to a long healing period that is very uncomfortable to the patient. In some cases the removal of the implant will cause irreversible damage annulling the possibility of restoring with a replacement implant.

Alternatively broken implants may be left untreated and/or abandoned leaving it embedded within the jaw. However, in so doing a practitioner and patient are taking a risk of further irreversible damage to bone and soft tissues.

SUMMARY OF THE INVENTION

There is an unmet need for, and it would be highly useful to have, a system, device and a method for saving and/or re-storing use of a damaged dental implant and in particular to implants that are broken and/or cracked.

Embodiments of the present invention provide a system, device and method for saving and restoring use of a damaged dental implants and in particular a dental implant having a neck-level mechanical failure such as breaks and/or cracks.

Embodiments of the present invention provide for facilitating removal of the damaged portion of the dental implant while maintaining the core of the dental implant, creating a new interface platform and utilizing the implant's internal threaded borehole for building a customized abutment around a dual threaded fixation screw.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof.

There are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, many of those permutations and combinations will not be discussed separately herein.

As used herein, the indefinite articles "a" and "an" mean "at least one" or "one or more" unless the context clearly dictates otherwise.

Herein the term "proximal" generally refers to the side or end of a device that is intended to be closer to the performing practitioner, further from the location of the intervention. The term "distal" generally refers to the side or end of a device that is intended to be closer to or at the location of the intervention, and therefore further away from the performing practitioner.

Importantly, this Summary may not be reflective of or correlate to the inventions protected by the claims in this or continuation/divisional applications hereof. Even where this Summary is reflective of or correlates to the inventions protected by the claims hereof, this Summary may not be exhaustive of the scope of the present inventions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 3 is a schematic illustrative diagram of a guiding member according to embodiments of the present invention;

FIG. 4 is a schematic illustrative diagram of a system according to embodiments of the present invention;

FIG. 5A-E are different view of a schematic illustrative diagram of a dual threaded fixation screw according to embodiments of the present invention;

FIG. 6A-B are different view of a schematic illustrative diagrams of a customized abutment interface member according to embodiments of the present invention;

FIG. 6C-D are different view of a schematic illustrative diagrams of a customized abutment interface member according to embodiments of the present invention;

FIG. 7A-D are different view of a schematic illustrative diagram of a customized abutment post member according to embodiments of the present invention;

FIG. 9A-B are different views, exploded and assembled, of a schematic illustrative diagram of a system according to embodiments of the present invention.

DESCRIPTION OF THE PREFERRED EMBODIMENTS

The principles and operation of the present invention may be better understood with reference to the drawings and the accompanying description. The following figure reference labels are used throughout the description to refer to similarly functioning components are used throughout the specification herein below.

| | |
|---|---|
| 10 | dental implant; |
| 12 | borehole threading; |
| 14 | implant neck; |
| 15 | implant mechanical failure; |
| 20 | re-surface level; |
| 50 | guide member; |
| 52 | guide distal portion; |
| 52t | guide distal portion threading; |
| 54 | guide medial portion; |
| 56 | guide proximal portion; |
| 100, 101, 103 | implant restoring system; |
| 110 | dual thread fixation screw; |
| 112 | fixation screw distal portion; |
| 112t | distal portion threading; |
| 114 | fixation screw medial portion; |
| 116 | fixation screw proximal portion; |
| 116t | proximal portion threading; |
| 118 | fixation screw tooling aperture; |
| 118t | tooling aperture threading; |
| 118e | external tooling aperture; |
| 118f | external tooling aperture threading; |
| 120 | abutment interface member; |
| 121 | abutment interface member; |
| 121s | interface shoulder; |
| 122 | interface distal portion; |
| 122e | distal end/distal end surface; |
| 122o | distal portion malleable end; |
| 122t | interface distal portion threading; |
| 124 | interface medial portion; |
| 126 | interface proximal portion; |
| 126s | interface shoulder; |
| 128 | interface-implant O-ring; |
| 128r | O-ring receiving recess; |
| 130 | abutment axis post member; |
| 131 | abutment post member; |
| 131s | post shoulder; |
| 132 | post distal portion; |
| 132e | post external threading; |
| 132t | post internal threading; |
| 134 | post medial portion for tooling; |
| 136 | post proximal portion; |
| 140 | reinforcing sleeve member; |
| 141 | proximal end; |
| 142 | external threading; |
| 143 | distal end; |
| 143r | distal end rim; |
| 143m | malleable edge; |
| 144 | internal threading; |

Figure 1:
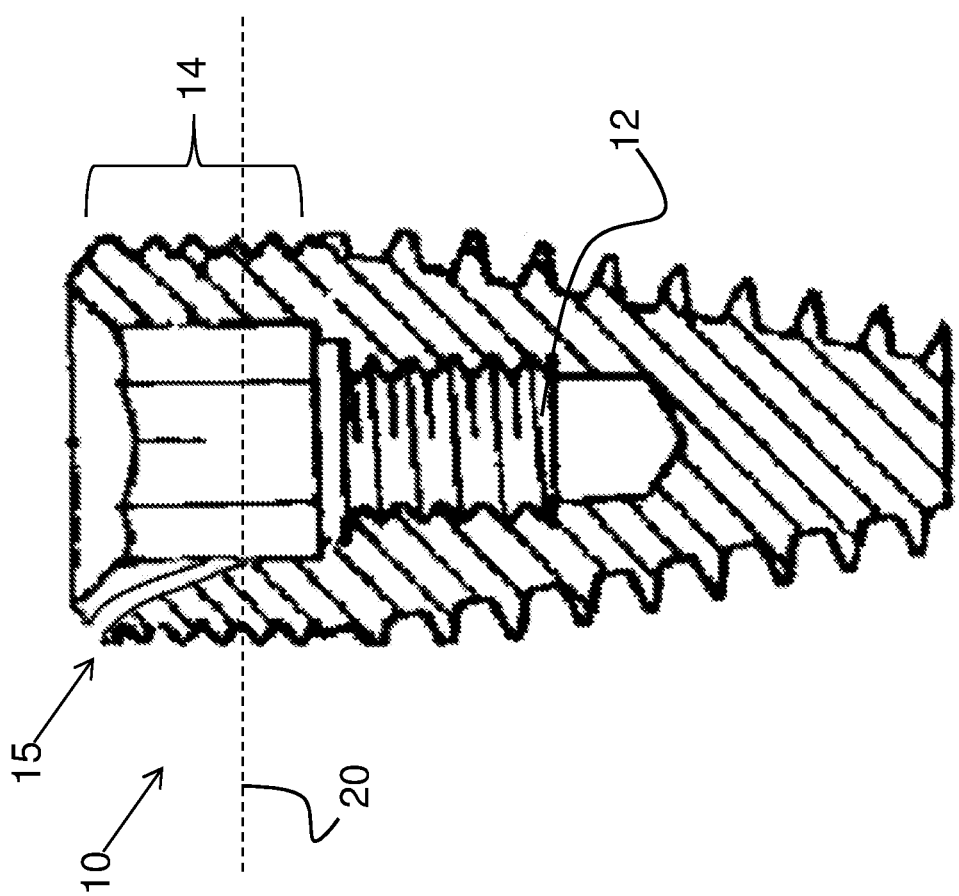
FIG. 1 is a schematic illustrative diagram of an exemplary prior art dental implant experiencing a mechanical failure.

FIG. 1 shows a prior art dental implant 10 that has developed a mechanical failure 15 in the form of a crack or breakage along the implant's neck portion 14. An intact implant 10 comprises internal borehole threading 12 that is generally utilized to receive and securely couple with a fixation screw as is known in the art (not shown). The fixation screw is used to affix an abutment (not shown) to implant 10.

A crack, breakage or similar mechanical failure 15 of implant 10 along the implant neck portion 14 renders the implant 10 nonfunctional as it can no longer support the abutment and the crown associated with it.

As previously indicated current method of treatment of such implant structural failures would call for either abandoning the implant, leaving it unused in the jaw. Or, the treatment may call for surgical removal of the implant, followed by augmentation and grafting the hard and soft tissues, all leading to a prolonged healing period of 12-18 months. In general, implant mechanical failures lead to irreversible damage to the morphology of jaw that may be so severe as to limit future use of implants.

There is no solution in the art for saving cracked or broken implant. Current the treatments consist of extracting the implant which results in prolong healing period and additional high expenses, or may cause irreversible damage to the jaw bone and without the ability to reintroduce an implant in that area of the jaw.

Figure 2:
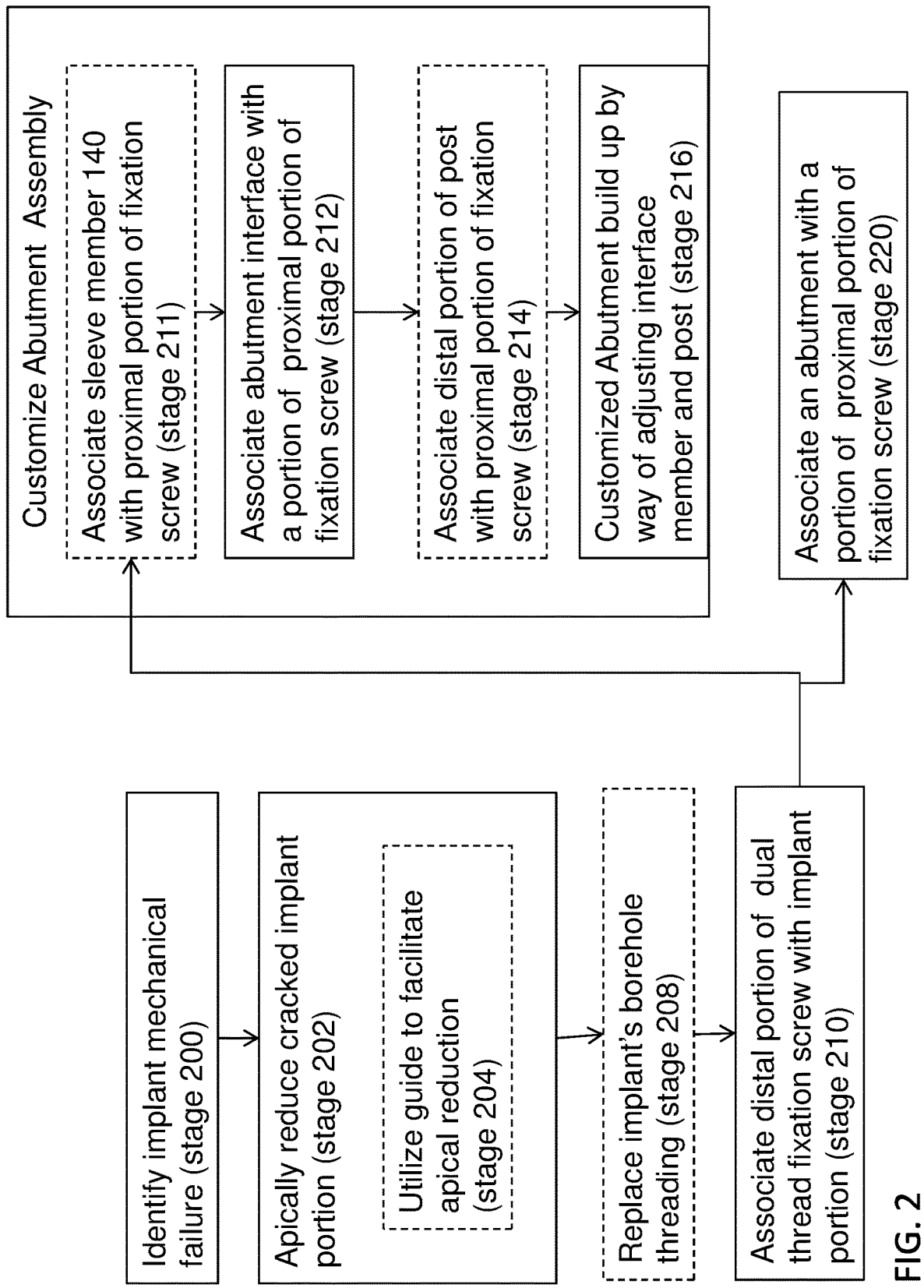
FIG. 2 is a flowchart of an exemplary method according to embodiments of the present invention.

Embodiments of the present invention provide a method for rehabilitating and/or restoring use of such a damaged dental implant 10. The method, as shown in greater detail in the flowchart of FIG. 2, provides for removing the cracked and/or damaged portion 15, 14 of implant 10 and resurfacing the implant to a new level indicated by a re-surface plane 20. Re-surface plane 20 and borehole threading 12 are utilized as a platform to build a customized abutment utilizing system 100, for example as shown in FIG. 4, according to embodiments of the present invention, as will be described in greater detail below. Therefore system 100 enables to rehabilitate and/or to restore the use of a damaged implant 10.

FIG. 2 shows a schematic flowchart of a method for restoring use of a cracked dental implant according to embodiments of the present invention. Optional stages utilized as part of the method and described hereinbelow are shown in broken lines.

Initially in stage 200 a dental implant mechanical failure 15, for example crack as shown in FIG. 1, is identified. Optionally to the implant and/or damaged area is further isolated providing a safe working space for a practitioner.

Following identification the method comprises two phases. A first phase of the method is depicted in stages 202 to 208 that detail the preparations of a damaged dental implant 10 so as to prepare and/or enable it for restored use. A second phase of the method is depicted in stages 210 to 216 that detail how the implanted implant 10 is restored to use with an implant restoring system 100.

Following stage 200, in stage 202, the damaged implant is apically reduced to remove the damaged portion 15 of the implant. For example as shown in FIG. 1 implant 10 may be apically reduced to a re-surface level and/or plane 20, therein removing the damaged portion of the implant.

Next in optional stage 204, apical reduction may be performed with a guide member 50, and optional stage 208, may be implemented for remodeling the implant's (10) borehole threading. Such optional stages 204,208 may be performed following stage 202 in order to further facilitate the method for restoring use of a damaged implant. Optionally the process of apical reduction may be facilitated with a guide member 50, shown in FIG. 3, as depicted in stage 204. Optionally a threaded distal portion 52 of guide member 50 is associated with the implant's borehole threading 12 to create a guiding axis along which a tool may be utilized to facilitate apical reduction and surfacing of implant 10 to plane 20 (FIG. 1). A tool that may for example be utilized in such apical reduction is disclosed in a co-owned co-pending published patent application, PCT Publication No. WO2014/108906, that is incorporated herein by reference as fully set forth herein. Following resurfacing of implant 10 to surface 20, guide member 50 is disassociated from implant 10.

Next in optional stage 208, the implants' borehole threading 12 may be replaced and/or configured according to a coupling interface utilized by system 100, for example including but not limited to dual thread fixation screw 110. Optionally borehole threading 12 may be configured and/or replaced by optional means as is known in the art. Optionally, threading tools may be utilized to re-thread and/or to change the threading configuration of borehole threading 12. Optionally, an implant borehole insert may be utilized to replace borehole threading 12. For example, an implant borehole insert that may be utilized is described in a co-pending and co-owned PCT Patent Publication No. WO/2015/008284.

Next in phase two, stages 210 to 216 provide details of how an implant restoring system 100, shown in FIG. 4, is utilized to form a customized abutment on the remaining portion of implant 10.

In stage 210, borehole 12, or a modified borehole, is utilized to associate implant 10 with a dual thread fixation screw 110, shown in FIG. 5A-B. Dual thread fixation screw 110, having a distal portion 112 featuring a first threaded portion and a proximal portion 116 featuring a second threaded portion. Most preferably distal portion 112 is securely associated with borehole 12 of resurfaced implant 10. Preferably first threading of distal portion 112 is configured to match and couple with the threading of borehole 12. Optionally distal portion 112 may be coupled and/or securely associated with borehole 12 by other coupling means such as cementing.

Following stage 210 the rehabilitation and restored use of implant 10 may be facilitated by associating optional abutments or an abutment assembly with the second threaded portion of proximal portion 116.

In embodiments, an off the shelf abutment may be associated with dual thread fixation screw 110, for example as depicted in stage 220. Off the shelf abutment may be provided in optional forms for example including but not limited to a prefabricated abutment or a CAD/CAM abutment, or an individualized abutment, or any abutment as are known in the art.

In embodiments as depicted in stages 211-216, a customized abutment assembly may be built-up along the proximal portion 116 of dual fixation screw, in a manner similar to that as was previously described in co-owned and co-pending patent applications as published in PCT Patent Publication WO2013/014643, incorporated here by reference as fully set forth herein.

In embodiments the method may initiate with stage 211 or stage 212 described below. In optional stage 211 a reinforcing sleeve member 140, shown and described in FIG. 8A-C, may introduced to be utilized to facilitate further strengthening and/or reinforcing coupling between dual thread fixation screw 110 to the resurfaced implant 10 at surface 20. Optionally and preferably reinforcing sleeve member 140 may further provide for associating an abutment or abutment assembly associated therewith, as described in stages 212-216.

In stage 212, an abutment interface member 120,121 is associated over at least a portion of a proximal portion 116 of fixation screw 110. Distal portion 122 of interface member 120 (FIG. 6A-B) is associated with proximal portion 116. Distal portion 122 of interface member 120, 121 comprises threading configured to match the threading of proximal portion 116.

In embodiments, interface member 120, 121 may further comprise a malleable O-ring member 128, FIG. 6C-D, provided to ensure a close fit with implant resurfaces surface 20.

Next in optional stage 214, an abutment axis post member 130 is associated over at least a portion of proximal portion 116 of dual thread fixation screw 110. Distal portion 132 of post 130 is associated with proximal portion 116. Distal portion 132 of post member 130 comprises threading configured to match the threading of proximal portion 116.

Therein following stages 212 and 214 both an interface member 120 and post member 130 are securely coupled to dual thread fixations screw 110 along its proximal portion 116, for example as shown in FIG. 4, while distal portion 112 of dual thread fixation screw 110 is securely associated with re-surfaced implant 10 along borehole 12.

Finally in stage 216 an abutment assembly comprising interface member 120 and post 130 are customized according to the in-situ chair side clinical situation. Most preferably both the abutment interface 120 and post 130 are customized according to the clinical situation to build-up an abutment, in a manner similar to that as was previously described in co-owned and co-pending patent applications as published in PCT Patent Publication WO2013/014643, incorporated here by reference as fully set forth herein. Post 130 is adjusted along proximal portion 136 for example by way of bending to provide an axis that is preferably both perpendicular to the line of action (occlusal plane, horizontal plane, shoulder) and parallel to the adjacent teeth and/or additional abutments. Interface member 120 is customized by utilizing the axis provided by post 130,131 to facilitate the process of apically reducing and shaping proximal portion 126 to assume the appropriate surface, contour and height relative to the host tissue. Optionally post 130, 131 and/or interface member 120,121 may be customized and/or adjusted chairside or in a laboratory condition. Following customization of the interface member and post according to the host tissue and in relation to the line of action and occlusal plane, dental cement and/or filling material is introduced into the lumen 120L of interface member 120, 121 to affix the abutment assembly and along the proximal portion of post 130,131, therein forming a customized abutment base. The dental cement and/or filling material may be fashioned or molded, optionally with the at least one or more molding sleeve members (not shown), so as to form an abutment body utilized for coupling with dental restoration, bridge member and/or crown along the axis formed by post 130,131. Most preferably, the abutment base formed by the interface proximal portion 120, 121 further provides a shoulder onto which the restoration, bridge, and/or crown rests. The abutment base shoulder that is customized along the upper rim of proximal portion 126 of interface member 120,121, is customized according to the host tissues so as to provide a custom fit abutment assembly, such that the shoulder of the restoration, bridge and/or crown fit in along the shoulder along the upper rim of proximal portion 126.

FIG. 3 shows a schematic illustrative diagram of guide member 50 that may be utilized as a tool to facilitate apical reduction of the damaged portion 15 of dental implant 10. Guide member 50 provides an axis onto which tools may be utilized to apically reduce and/or resurface implant 10 to a new plane 20.

Guide member 50 includes a distal portion 52 for associating with the implant borehole and a proximal portion 56 providing a guiding tooling axis that is used by tools to apically reduce and/or file to a surface below the damaged and/or cracked portion 15 of implant 10, to a surface or point below the damaged portion 15.

Most preferably distal portion 52 is cylindrical and configured to match the shape and dimension of the internal borehole 12 of implant 10. Optionally and preferably distal portion 52 comprises threading 52t that provides for securely coupling with the implant's 10 borehole threading 12.

In embodiments, proximal portion 56 may be provided in the form of a rod-like shape that provides a guiding axis for tools associated therewith. Optionally the shape of proximal portion 56 may be configured and/or specific according to the tools used therewith.

In embodiments guide member 50 may further comprise a medial portion 54 disposed between distal end 52 and proximal end 56. Preferably proximal end 56 forms a guide member for a tool to facilitate undertaking apical reduction of the implant damaged portion 15 for example as previously described in optional stage 204 of FIG. 2. Proximal end 56 may assume any shaped profile for example including but not limited to hexagonal, square, or the like.

Medial portion 54 is configured to facilitate fitting with borehole 12 of implant 10 therein stabilizing guide 50 within the implant 10 associated therewith.

Preferably guide member 50 provides an axis, in the form of proximal end 56 that allows apical reduction of cracked implant 10 to remove the damaged portion 15. Optionally and preferably apical reduction is provided to a re-surfacing plane 20 that is at or below the distal end of the damaged portion 15.

FIG. 4 shows a schematic illustrative diagram showing a cross section of system 100 according to embodiments of the present invention. As previously described system 100 provides for restoring use of a damaged implanted dental implant 10, FIG. 1. System 100 restores use of implant 10 by removing the damaged portion 15, 14 so as to regain use and function of borehole 12. Borehole 12 is then used as a coupling platform with which system 100 is coupled and used to build-up a customized dental implant abutment.

System 100 includes a dual thread fixation screw 110 (FIG. 5A-C), a customized abutment interface member 120 (FIG. 6A-B) and a customized abutment post member 130 (FIG. 7A-D).

Abutment interface member 120 (FIG. 6A-B) and post member 130 (FIG. 7A-D) form an assembly onto which a customized abutment is built or mounted. Preferably interface member 120 forms the base of the abutment while the post member provides the axis of the abutment. The customized abutment may be configured according to the individual clinical situation at hand in and around the damaged implant 10, for example in a manner similar to that as was previously described in co-owned and co-pending patent applications as published in PCT Patent Publication WO2013/014643, incorporated here by reference as fully set forth herein.

Preferably interface member 120 and post 130 are configurable so as to match the clinical situation at hand. For example, both interface member 120 and post 130 may undergo adjustments, such as shaping and surfacing in relation to the peri-implant tissue, adjacent and opposite teeth. Such adjustment may include the surfacing and/or apical reduction of the proximal portion 126 of interface member 120 such that proximal portion assumes a surface that is parallel with the occlusal plane and in relation with the biologic width and soft tissues. Similarly, controlling the angle, position and height of the proximal portion 136 of post 130 provides for defining the optimal end-position and configuration of a customized abutment about the opposite and adjacent teeth. This customized abutment ensures the optimal biomechanical shape and position for the dental implant assembly including: implant, abutment and restoration. Accordingly the customized abutment is configurable with respect to the host tissues and teeth along the same and opposite jaw, as previously described in co-owned and co-pending patent applications and published under PCT Patent Publication WO2013/014643, incorporated here by reference as fully set forth herein.

As shown system 100 is built around a dual thread fixation screw 110 that provides for restoring use of cracked implant 10. Dual thread fixation screw 110 provide s two threading interfaces a first (distal) threaded interface 112t to facilitate coupling to borehole 12 of cracked implant 10 and a second (proximal) threaded interface portion 116t that provides for coupling to an abutment more preferably the customized abutment assembly members comprising interface member 120 and post 130.

Dual thread fixation screw 110 is shown in greater detail in FIG. 5A-B. FIG. 5A shows a side view of dual thread fixation screw 110 that features a distal portion 112, medial portion 114 and proximal portion 116. FIG. 5B shows a perspective view of dual thread fixation screw 110 showing tooling aperture 118 used to facilitate manipulating and placing fixation screw 110.

Distal portion 112 comprises threading 112t defining a first threading interface that is configured to securely associate with borehole 12 of cracked implant 10.

Proximal portion 116 comprises threading 116t defining a second threading interface that is configured to receive and securely associate with an abutment. Optionally proximal portion 116 may provide for associating with any abutment for example including an off the shelf abutment, a prefabricated abutment, a CAD/CAM abutment, and more preferably with an abutment assembly including interface member 120 and post 130, or the like abutment. Most preferably the length of proximal portion 116 is configured so as to be able to receive both interface member 120 and post 130 along its length.

Preferably the end of proximal portion 116 may further comprise a tooling aperture 118 provided for rotating and/or otherwise manipulating dual thread fixation screw within borehole 12 of implant 10. Optionally tooling aperture may be provided in optional forms for example as an internal tooling aperture 118 or an external tooling aperture 118e.

Optionally proximal portion 116 is provided with an overall larger diameter than the distal portion 112.

Medial portion 114 may be shaped so as to have a larger diameter at its proximal side than its distal side, therein providing medial portion 114 with a conical profile.

Distal portion threading 112t and proximal portion threading 116t are characterized in that the first threaded portion and the second threaded portion have threading are configured to advance and/or close and/or lock in opposite rotational directions and therein exhibit counter-rotational locking therein each threading advances in the opposite direction.

For example, if distal portion threading 112t is configured to close in the clockwise direction, then proximal portion threading 116t is configured to close in the counter-clockwise direction.

For example, if distal portion threading 112t is configured to close in the counter-clockwise direction, then proximal portion threading 116t is configured to close in the clockwise direction.

Such opposite directional counter locking configuration as provided by the dual threaded fixation screw 110 provides for increasing interlocking stability between implant 10 and an abutment associated therewith, for example including but not limited to abutment interface 120, to prevent abutment loosening from the implant. Such configuration further provides support for the new abutment and implant connection required due to the mechanical failure of the implant 10.

FIG. 5C shows an optional dual thread fixation screw 110 where tooling aperture 118 further features internal threading 118t. Internal threading 118t may be utilized to couple with optional devices for example including but not limited to an optional post 130, for example as shown in FIG. 7D, where the post 130 features external threading 132e disposed along its distal portion 132.

In embodiments, internal threading 132e and external threading 132t may be configured to be in opposite direction such that one is clockwise while the other is counterclockwise.

Figure 5E:
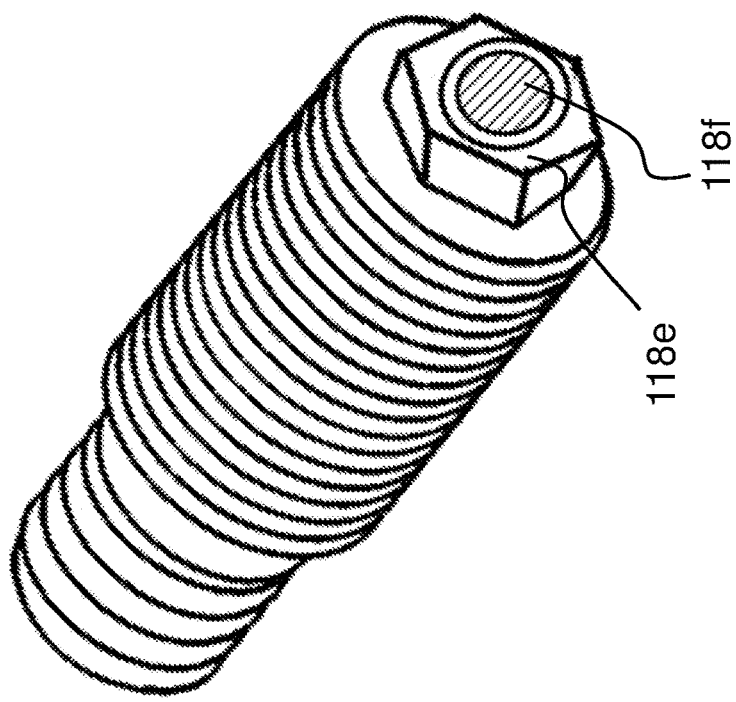
Figure 5D:
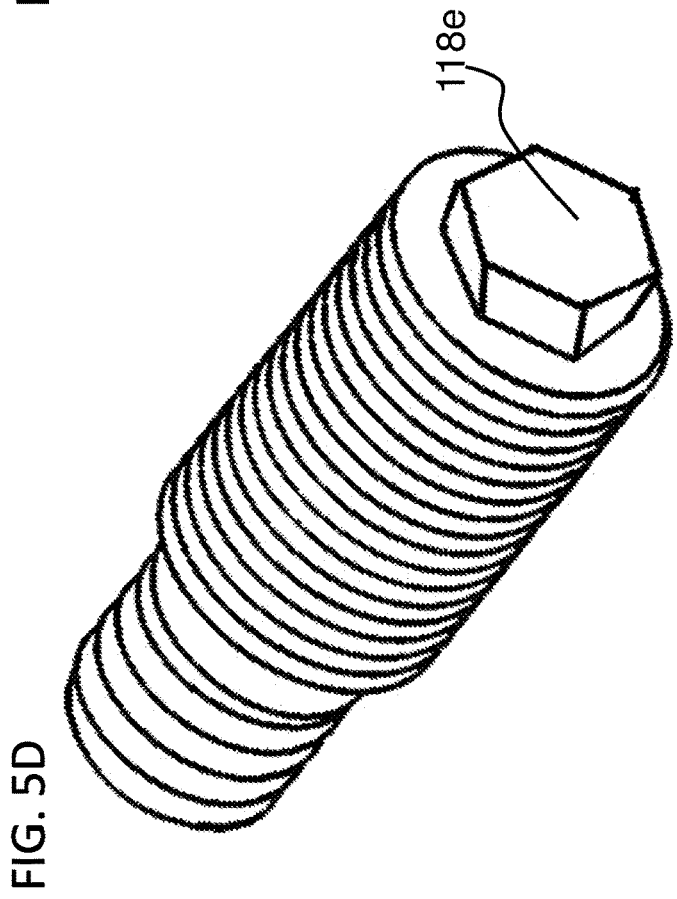

FIG. 5D-E show optional dual thread fixation screw 110 featuring an external tooling aperture 118e. FIG. 5D shows an external tooling aperture 118e in the form of an external hex. FIG. 5E shows an external tooling aperture 118e further featuring an internal threading 118f for coupling further items for example including but not limited to post 130, a fixation screw, or the like.

FIG. 6A shows a side view of abutment interface member 120 according to embodiments of the present invention. Interface member 120 comprises a distal portion 122, medial portion 124 and proximal portion 126. Preferably proximal portion 126 features a cup like cylindrical wall configuration featuring an open lumen 120L. At least one or both of the external or internal surface of the proximal portion 126 of interface member 120 may be provided in the form of a closed polygon having n sides wherein n is at least 5 (n>5).

As previously described, proximal portion 126 may be adjusted so as to best fit the clinical situation at hand and in particular to assume a surface that is parallel to the occlusal plan and in respect with the biologic with and mucosal tissues.

An optional medial portion 124 may provide for transitioning phase from the diameter of cylindrical distal portion 122 to the diameter of cylindrical proximal portion 126, for example as shown. Interface member 120 may be devoid of a medial portion 124.

Distal portion 122 has a cylindrical body having an open lumen wherein the distal portion wall features threading 122t along its internal surface, for example as shown in FIG. 6B. Most preferably threading 122t is configured to match and couple with at least a portion of proximal portion threading 116t of dual thread fixation screw 110.

Optionally and preferably threading 122t is configured to lock and/or advance in the counter-clockwise direction, therein matching the counter-clockwise direction of proximal threading 116t.

Optionally and preferably the distal portion 122 of interface member 120 may be associated with dual thread fixation screw 110 along the proximal portion 116 adjacent to proximal end of medial portion 114, for example as shown in FIG. 4. Optionally and preferably distal portion 122 comprises an inner lumen diameter that is configured according to the diameter of the proximal portion 116 of fixation screw 110, so as to allow coupling therebetween.

Preferably the inner diameters of medial portion 124 and proximal portion 126 are configured to be larger than the diameter of the proximal portion 116 of fixation screw 110, so as to allow the medial portion 124 and proximal portion 126 to further receive and house at least a portion of proximal portion 116 and distal portion 132 of post 130, for example as shown in FIG. 4.

In embodiments interface member 126 may comprise an internal shoulder 126a, for example as shown in FIG. 6B-D.

As shown in FIG. 6C interface member 120 may further utilize an O-ring 128 to facilitate sealing and/or close fitting and/or coupling with a resurfaced implant 10 at re-surface level 20. Preferably O-ring provides for mediating between the re-surfaced level 20 of implant 10 and distal end lower surface of interface member 120 so as to ensure proper fit. O-ring 128 may be provided from optional materials such as silicon, gold, silver, titanium, tantalum, metal alloys, polymers, titanium alloys, composite material, dental adhesive, the like or any combination thereof. More preferably O-ring 128 is provided from malleable materials that may deform under mechanical pressure to assume the contour of the surface formed between distal end 122e and re-surfaced level 20 so as to provide a close fit and/or sealed fit between implant 10 and interface member 120.

The distal end of interface member 120 may further comprise an O-ring dedicated recess 128r, also shown in FIG. 6D. O-ring recess 128r is configured to receive and/or house an optional O-ring 128 at the distal end of interface member 120.

FIG. 6D shows an embodiment of interface member 120 as previously described and further comprising a malleable end or edge 122o defined along distal end 122e. Malleable end 122o may be provided from a thin layer of a malleable materials and/or alloys, for example including but not limited to gold, titanium tantalum, silver, polymers, alloys, metal alloys, any combination thereof or the like materials, that may deform under mechanical pressure to assume the contour and/or provide a close fit with the surface formed between distal end 122e and re-surfaced level 20 of implant 10 so as to provide a close fit between implant 10 and interface member 120.

In embodiments malleable end 122o may be provided from thin material having a thickness of about 0.02 mm. Optionally thickness may be from about 0.01 mm and up to about 0.05 mm.

FIG. 7A-D show various view of post 130. As previously described post 130 features a proximal portion 136 including a rod-like extension that defines a customizable axis onto which an abutment may be build and/or attached, for example in a manner similar to that as was previously described in co-owned and co-pending patent applications as published in PCT Patent Publication WO2013/014643, incorporated here by reference as fully set forth herein.

Post 130 features a proximal portion 136, medial portion 134 and distal portion 132. Post 130 according to embodiments of the present inventions is characterized in that, distal portion 132 features internal threading 132t configured to match and couple with proximal threading 116t of dual thread fixation screw 110.

FIG. 7D shows an optionally configuration of post 130 having distal portion 132 that further features external threading 132e along its external surface. Post external threading 132e may be utilized to couple with internal 118t threading disposed on proximal portion 118 of fixation screw 110, FIG. 5C.

Post 130 is characterized by distal portion 132 having a nut like configuration including an open internal lumen featuring internal threading 132t.

Optionally and preferably threading 132t is configured to advance and/or lock in the counter-clockwise direction, therein matching the counter-clockwise direction of proximal threading 116t.

Most preferably the length of distal portion 132 is configured relative to the proximal portion 116 of dual thread fixation screw 110 and the distal portion 122 of interface member 120. Most preferably the length of the proximal portion 116 of fixation screw 110 is configured to match the combined length of distal portion 122 of interface member 120 and distal portion 132 of post therein allowing both distal portion 122,132 to be coupled by way of threading along the length of proximal portion 116, for example as shown in FIG. 4.

Medial portion 134 preferably provides an anti-rotational tooling interface, for example as shown, that allows a practitioners to manipulate and maneuver post 130 with appropriate tools.

Proximal portion 136 features a rod like extension that is readily conducive to adjustments such as bending, cutting, to assume a chosen and clinically optimal position and dimension.

In embodiments proximal portion 136 may further features threading utilized to associate with additional abutment building tools and/or prosthodontic elements or device in a manner similar to that as was previously described in co-owned and co-pending patent applications as published in PCT Patent Publication WO2013/014643, incorporated here by reference as fully set forth herein.

In embodiments, proximal portion 136 threading may be continuous or intermittent (as shown) or distributed along proximal portion 136 in any manner.

Optionally proximal portion 136 may be devoid of threading.

Figure 8C:
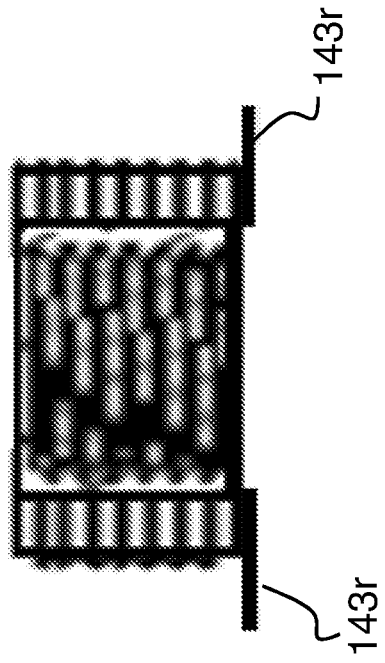
FIG. 8A-C are cross sectional views of a schematic illustrative diagram of a reinforcing sleeve member according to embodiments of the present invention.
Figure 8B:
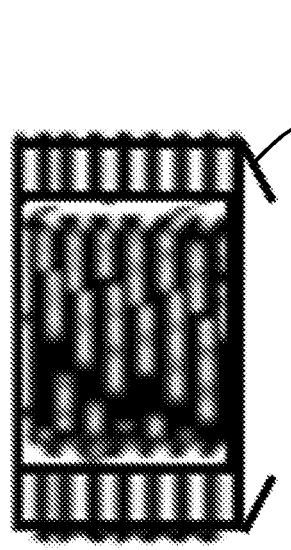
Figure 8A:
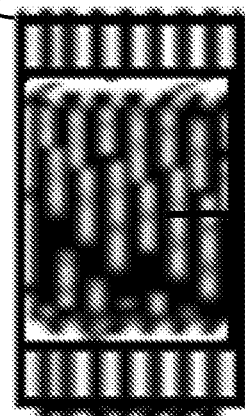
Figure 9C:
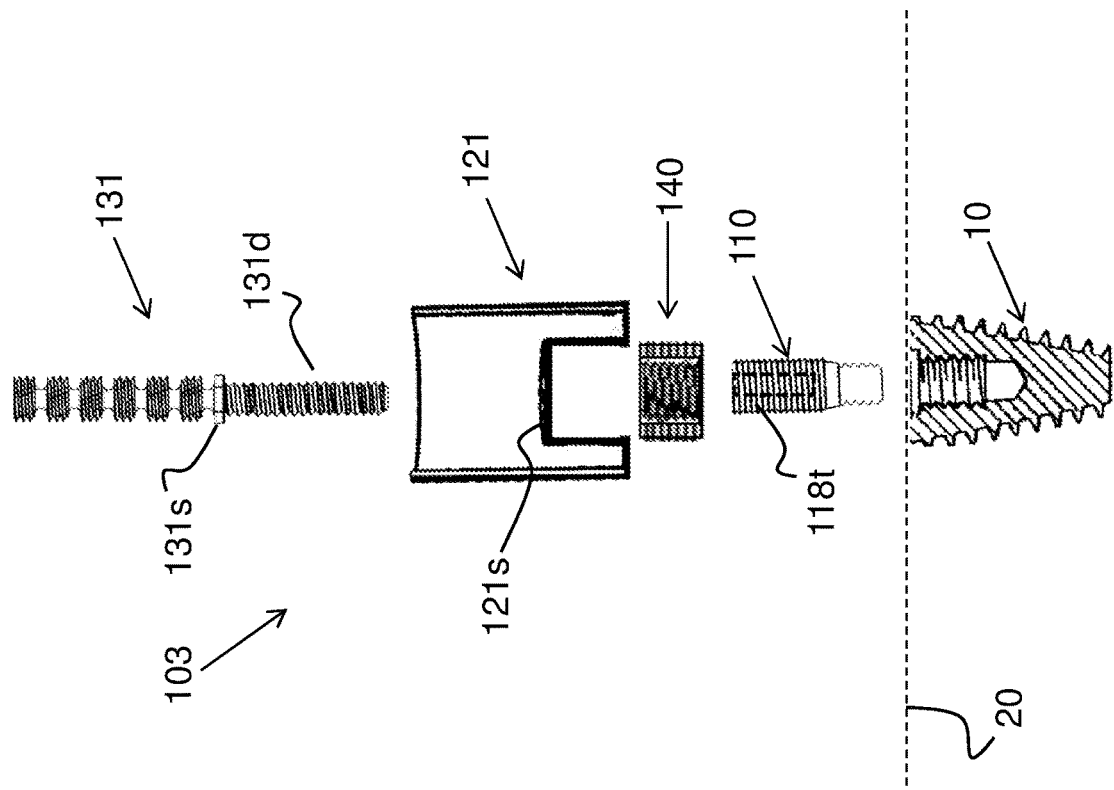
FIG. 9C-D are different views, exploded and assembled, of a schematic illustrative diagram of a system according to embodiments of the present invention.

FIG. 8A shows a cross sectional view of a reinforcing sleeve member 140, most preferably reinforcing sleeve 140 provides for further securing dual thread fixation screw 110 onto implant 10 at resurface 20. Reinforcing sleeve member 140 further provides for facilitating coupling between the proximal portion dual 116 of thread fixation screw 110 and one of interface member 120, for example as shown in FIG. 9C, or post member 130, for example as shown in FIG. 9A-B. Reinforcing sleeve member 140 is a hollow tubular member having a proximal end 141 and distal end 143 having an internal lumen fit with a first internal threading 144, and an external surface fit with a second external threading 142.

Internal threading 144 is preferably configured to match and couple and/or associated with the threading disposed along proximal portion 116 of dual thread fixation screw 116.

External threading 142 is preferably configured to match and couple and/or associated with corresponding threading along one of interface member 120 or post member 130. For example, external threading 142 may be configured to match and/or couple with threading 122t disposed along interface member 120. For example external threading 142 may be configured to match and/or correspond and/or couple with threading 132t disposed along post member 130.

In embodiments, internal threading 144 and external threading 142 may be configured to be in opposite direction such that one is clockwise while the other is counterclockwise.

In embodiments, internal threading 144 and external threading 142 may be configured to both be in same direction such that both are either clockwise advancing or counterclockwise advancing.

FIG. 8B shows an embodiment of reinforcing sleeve 140 as previously described, where distal end 143 further comprises a wide flange and rim 143r, for example having a disc like shape forming a shoulder onto which sleeve may interface and/or rest onto surface 20 of resurfaced implant 10. Optionally rim 143r may further comprise recess, not shown, for receiving an O-ring 128, as previously described.

FIG. 8C shows an embodiment of reinforcing sleeve 140 as previously described, where distal end 143 further comprises a malleable end and/or edge 143m. Edge 143m provided in the form of a malleable extension configured to deform to provide a close fit with surface 20 or any surface it abuts with.

Edge 143m may be provided from a thin layer of a malleable materials and/or alloys, for example including but not limited to gold titanium tantalum, silver, polymers, any combination thereof or the like materials, that may deform under mechanical pressure to assume the contour and/or provide a close fit with re-surfaced level 20 of implant 10 so as to provide a close fit between implant 10 and sleeve 140. In embodiments edge 143m may be provided from thin material having a thickness of about 0.02 mm. Optionally the edge thickness may be from about 0.01 mm and up to about 0.05 mm.

FIG. 9A shows an exploded view of an implant restoring system 101 that functional similarly to restoring system 100 as previously described, however further comprising a reinforcing sleeve member 140. Reinforcing sleeve member 140 is provided to interface between post 130 and dual thread fixation screw 110, to increase and reinforcing the holding force of assembly 101 onto resurfaced implant 10 at resurfaced plane 20. FIG. 9B shows a schematic illustration of the assembled system 101, depicted in FIG. 9A, showing reinforcing sleeve member 140 interfacing with a portion of post 130.

FIG. 9C shows an exploded view of an implant restoring system 103 that functional similarly to restoring systems 100, 101 as previously described, however further comprising a reinforcing sleeve member 140, associated over dual thread fixation screw 110 to further strengthen its coupling to resurfaced implant 10 at surface 20. System 103 comprises a dual thread fixation screw 110 featuring an internally threaded aperture 118t or 118f, FIG. 5B,5E, interface member 121, reinforcing sleeve member 140, and post member 131.

Post member 131 is provided with a threaded distal portion 131d provided for matching the internally threaded aperture 118t, 118f of the dual thread fixation screw 110. Therein threaded distal portion 131d provides for holding assembly 103 together. Post member 131 further comprises a medial portion tooling interface 134 and proximal portion 136 as previously described. The distal surface of tooling interface 134 forms a shoulder 131s provided for locking assembly 103 onto the resurfaced implant 10 by locking in the interface member onto surface 20.

FIG. 9C shows a cross section of interface member 121 is similar to interface member portion 120 previously described. Interface member 121 features an internal open lumen for accepting additional abutment assembly members for example including but not limited to post 131, sleeve 140, and dual thread fixation screw 110. Interface member 121 features an internal shoulder 121s that is provided to interface with shoulder 131s, as shown in FIG. 9D, where interface member 121 is locked into assembly 103 at shoulders 121s and 131s.

Figure 9D:
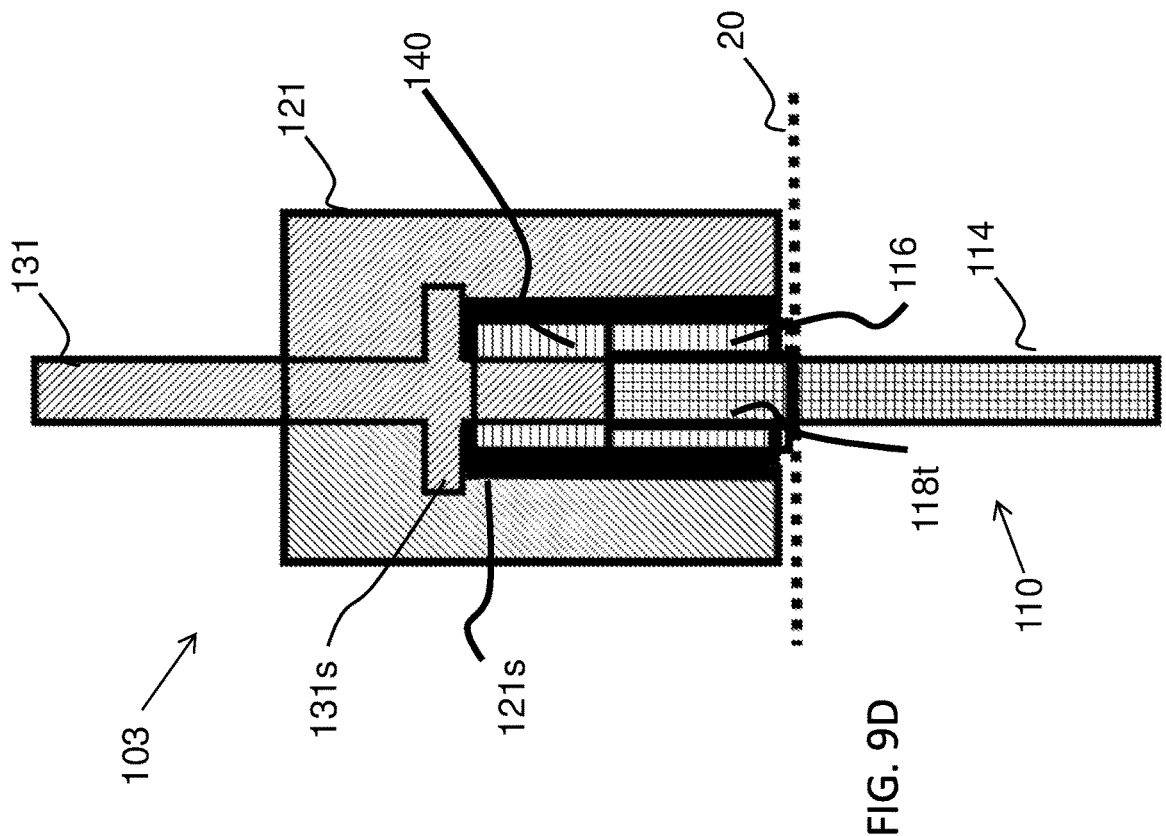

Reinforcing sleeve member 140 is provided to interface between interface member 121, post 131 and dual thread fixation screw 110, as shown in FIG. 9D, wherein post 131 and sleeve 140 increase or reinforcing the holding force of assembly 103. FIG. 9D shows a schematic illustration of the assembled system 103, depicted in FIG. 9C.

While the invention has been described with respect to a limited number of embodiment, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

The foregoing is considered as illustrative only of the principles of the invention. Further, since numerous modifications and changes will readily occur to those skilled in the art, it is not described to limit the invention to the exact construction and operation shown and described and accordingly, all suitable modifications and equivalents may be resorted to, falling within the scope of the invention.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Citation or identification of any reference in this application shall not be construed as an admission that such reference is available as prior art to the invention.

Section headings are used herein to ease understanding of the specification and should not be construed as necessarily limiting.

While the invention has been described with respect to a limited number of embodiments, it will be appreciated that many variations, modifications and other applications of the invention may be made.

What is claimed is:

1. A dental implant system for restoring use of a damaged in-situ dental implant by coupling an abutment assembly thereon, the system comprising:
   a. a tool guide member having a distal end and a proximal end, the distal end having a distal threading configured to couple with an internal threaded coupling interface of the damaged in-situ dental implant; the proximal end forming a guide for a tool to undertake apical reduction of a damaged portion of the damaged in-situ dental implant wherein after apical reduction, the tool guide member is disassociated from the damaged in-situ dental implant;
   b. a dual thread fixation screw having a distal portion having a first threading, and proximal portion having a second threading wherein said first threading and said second threading are configured to be in opposite rotational directions; wherein the distal portion of the dual thread fixation screw is coupled with the internal threaded coupling interface of the damaged in-situ dental implant;
   c. a customizable abutment assembly comprising:
      i. an interface member having an internal lumen and threading configured to match and couple with a distal portion of said second threading of the dual thread fixation screw; and
      ii. a post member having threading configured to match and couple with a proximal portion of said second threading of the dual thread fixation screw; and wherein said interface member lumen houses at least a portion of said proximal portion of said dual thread fixation screw and a distal portion of said post.

2. The system of claim 1 wherein said second threading is counter-clockwise threading and said first threading is clockwise threading.

3. The system of claim 1 wherein the threading of both said interface member and said post member is provided in the form of internal threading configured for locking with said second threading, and wherein said internal threading is disposed along a distal portion of said interface member and said post member.

4. The system of claim 1 further comprising a malleable O-ring configured to be associated with a distal end of the interface member.

5. The system of claim 1 wherein the interface member comprises a distal end recess provided for receiving a malleable O-ring member.

6. The system of claim 1 wherein the interface member comprises a malleable end along a distal end thereof.

7. The system of claim 6 wherein the malleable end further comprises an O-ring recess.

8. A dental implant system for restoring use of a damaged in-situ dental implant by coupling an abutment assembly thereon, the system comprising:
   a. a tool guide member having a distal end and a proximal end, the distal end having a distal threading configured to couple with an internal threaded coupling interface of the damaged in-situ dental implant; the proximal end forming a guide for a tool to undertake apical reduction of the damaged portion of the in-situ dental implant therein resurfacing the in-situ damaged dental implant, wherein after apical reduction the tool guide member is disassociated from the damaged in-situ dental implant;
   b. a dual thread fixation screw having a distal portion having a first threading, a proximal portion having a second threading wherein said first threading and said second threading are configured to be in opposite rotational directions; the proximal portion further comprising internal threading; wherein the distal portion of the dual thread fixation screw is coupled with the internal threaded coupling interface of the damaged in-situ dental implant;
   c. a reinforcing sleeve member configured to be coupled to the dual thread fixation screw along at least a portion of the second threading of the proximal portion;
   d. a customizable abutment assembly comprising an interface member and a post;
      i. the interface member provided in the form of a hollow tubular member having an open internal lumen and featuring a distal internal recess configured to house the reinforcing sleeve that is coupled with the dual thread fixation screw; and wherein the internal recess features an internal shoulder;

ii. the post having a distal end comprising threading configured to match and couple with the internal threading of the dual thread fixation screw and a medial portion providing a tooling interface and a shoulder, the shoulder configured to interlock with the internal shoulder of the interface member.

9. The system of claim 8 further comprising a malleable O-ring configured to be associated with a distal end of the interface member.

\* \* \* \* \*